May 15, 1962 H. G. AXTMANN 3,034,802
LEAF SPRING INDEPENDENT SUSPENSION WITH HEIGHT CONTROL
Filed Oct. 27, 1960 2 Sheets-Sheet 1

INVENTOR.
Harold G. Axtmann
BY
W. F. Wagner
ATTORNEY

May 15, 1962  H. G. AXTMANN  3,034,802
LEAF SPRING INDEPENDENT SUSPENSION WITH HEIGHT CONTROL
Filed Oct. 27, 1960  2 Sheets-Sheet 2

INVENTOR.
Harold G. Axtmann
BY
W. F. Wagner
ATTORNEY

United States Patent Office 3,034,802
Patented May 15, 1962

3,034,802
LEAF SPRING INDEPENDENT SUSPENSION WITH HEIGHT CONTROL
Harold G. Axtmann, Lansing, Mich., assignor to General Motors Corporation, Detroit, Mich., a corporation of Delaware
Filed Oct. 27, 1960, Ser. No. 65,458
6 Claims. (Cl. 280—96.2)

This invention relates to vehicle suspension and more particularly to leaf spring independent suspension for dirigible wheels.

An object of the invention is to provide an improved vehicle wheel suspension.

Another object is to provide an improved leaf spring type independent wheel suspension.

A further object is to provide a leaf spring independent suspension for dirigible wheels particularly adaptable to front drive vehicles.

Still a further object is to provide an independent leaf spring suspension incorporating means for controlling the height of the vehicle sprung mass relative to the unsprung mass.

Yet a further object is to provide a structure of the stated character wherein a single height control device acts on the suspension for both of the dirigible wheels.

Still another object is to provide a suspension of the stated character which is simple in construction, low in cost and dependable in operation.

These and other objects, advantages and features of the invention will become more fully apparent as reference is had to the accompanying specification and drawings wherein.

Figure 1:
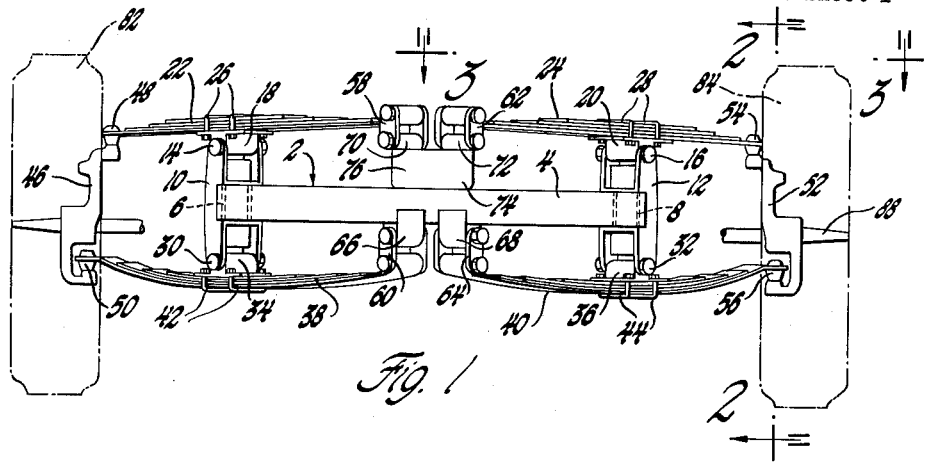
FIG. 1 is a front elevational view of a vehicle suspension in accordance with the invention.
Figure 2:
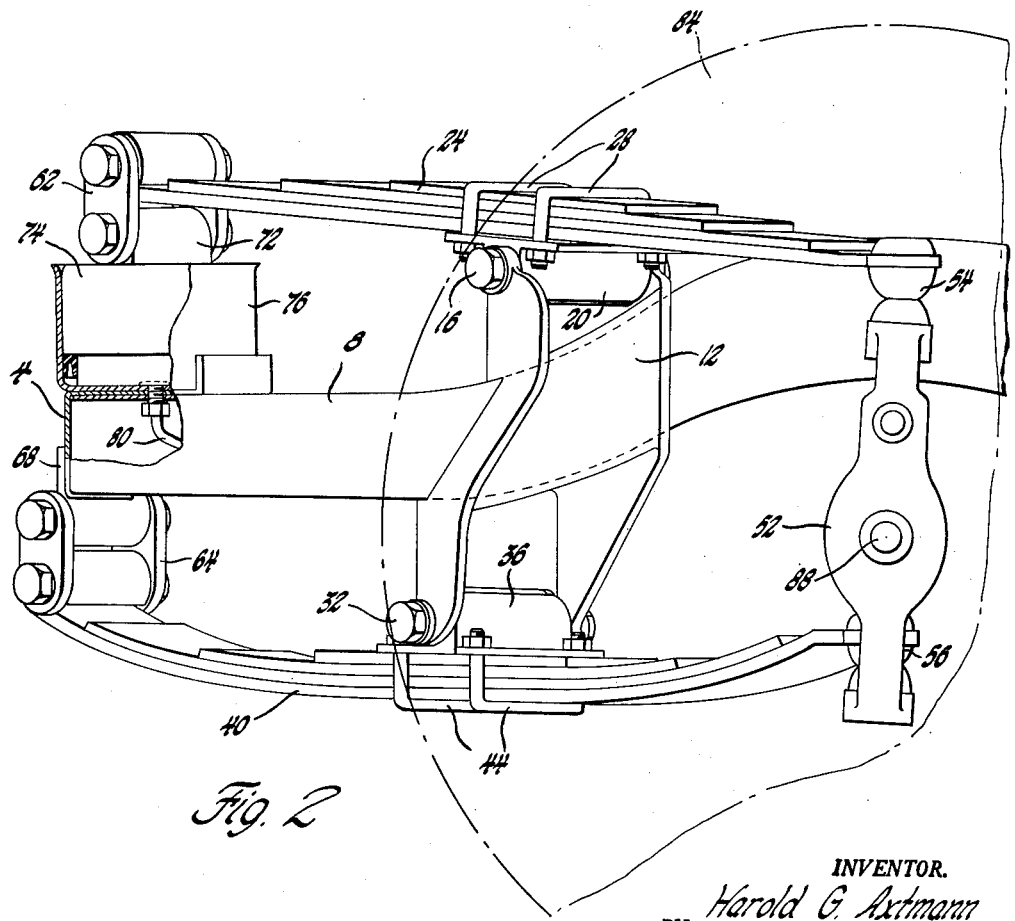
FIG. 2 is an enlarged fragmentary side elevational view, partly in section and with parts broken away, looking in the direction of arrows 2—2 of FIG. 1.

Referring now to the drawings and particularly FIG. 1, there is illustrated a vehicle chassis front end in which the reference numeral 2 designates the frame or sprung mass of the vehicle. Frame 2 includes a front cross member 4 and parallel side rails 6 and 8. Rearwardly of cross member 2, side rails 6 and 8 have affixed thereto vertically extending brackets 10 and 12, At their upper ends, brackets 10 and 12 carry horizontally extending pivot pins 14 and 16 upon which are rockably mounted spring fulcrums 18 and 20. Fulcrums 18 and 20 in turn are rigidly connected to upper leaf springs 22 and 24, respectively, midway of the length thereof by U-bolts 26 and 28. At their lower ends, brackets 10 and 12 carry horizontally extending pivot pins 30 and 32 upon which are journalled spring fulcrums 34 and 36. Fulcrums 30 and 32 in turn are rigidly connected to lower leaf springs 38 and 40 respectively midway of the length thereof by U-bolts 42 and 44. The outboard ends of upper spring 22 and lower spring 38 are pivotally connected respectively to the upper and lower ends of a vertically extending wheel spindle support 46 by ball joint assemblies 48 and 50. Similarly, the outboard ends of upper spring 24 and lower spring 40 are connected respectively to the upper and lower end of wheel spindle 52 by ball joint assemblies 54 and 56. At their inboard ends, lower springs 38 and 40 are connected to tension shackle members 60 and 64, while the inboard ends of upper springs 22 and 24 are connected to compression shackle members 58 and 62. Lower shackles 60 and 64 are both connected directly to depending brackets 66 and 68 which in turn are rigidly mounted on frame cross member 4.

Figure 4:
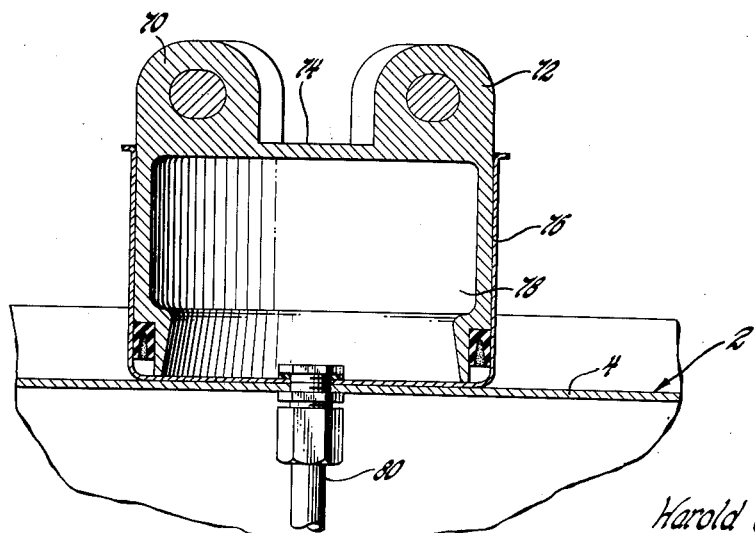
FIG. 4 is an enlarged fragmentary sectional view looking in the direction of arrows 4—4 of FIG. 3.

According to one feature of the invention, shackles 58 and 62 at the inboard ends of springs 22 and 24 are vertically displaceable relative to cross member 4 so that the level of the sprung mass above the ground may be maintained within a predetermined limit regardless of load variation. In the embodiment shown, shackles 58 and 62 are connected to brackets 70 and 72 formed integrally on the top wall of an inverted cup-shaped piston element 74. Piston element 74 in turn is reciprocably disposed in a cup-shaped cylinder 76 mounted on cross member 2 at the vehicle longitudinal centerline. As seen best in FIG. 4, piston 74 and cylinder 76 cooperate to form a closed cavity 78 which is connected to a source of hydraulic pressure, not shown, by a fluid conduit 80. It will be apparent that introduction of hydraulic pressure into cavity 78 will cause the piston 74 to move upwardly relative to cylinder 76 and hence displace shackles 58 and 62 upwardly relative to cross member 4. This upward displacement of the shackles imposes additional bending stress on springs 22 and 24. Since the vehicle wheels 82 and 84 are already resting on the ground, the increased bending stress imposed on upper springs 22 and 24 causes a reaction force which lifts frame 2 relative to wheels 82 and 84. It will be apparent that by utilization of any one of a number of well known height sensing fluid control mechanisms, flow of hydraulic fluid into or out of cavity 78 may be made to occur whenever frame 2 ascends or descends from a predetermined vertical level above the ground. It will also be clear that, if desired, regulation of displacement of piston 74 may be placed under control of the vehicle operator by the introduction of a simple hand operated valve, not shown, in conduit 80 between cavity 78 and the source of hydraulic pressure.

Figure 3:
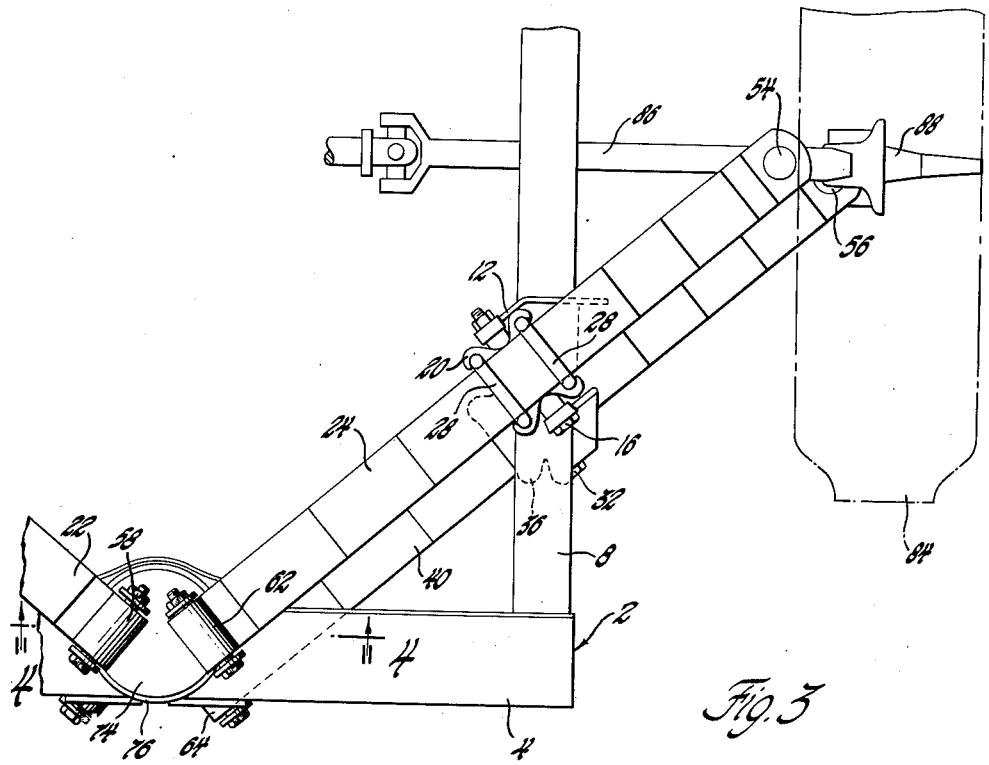
FIG. 3 is a partial plan view looking in the direction of arrows 3—3 of FIG. 1.

According to another feature of the invention, the various components of the suspension are disposed in such a way that the overall arrangement is particularly well suited for use in vehicles in which the dirigible wheels are also the driven wheels, i.e., the so-called front drive vehicle. As seen best in FIG. 3, upper leaf spring 24 and lower leaf spring 40 for the right wheel 84 lie in parallel relation and extend diagonally from the longitudinal centerline of the vehicle at approximately a 45° angle so that the rearward extremities of the springs are located a substantial distance outboard of bracket 12. As a result, the wheel driving half axle 86 is afforded an unobstructed path for connection with the wheel spindle 88 and adequate vertical clearance for oscillatory movement.

From the foregoing, it will be seen that a novel, improved, economical and versatile suspension has been provided. A diagonal disposition of the leaf spring elements not only offers significant advantages in connection with front wheel drive vehicles, but in addition permits the adoption of a single very inexpensive means for accomplishing vehicle trim height control.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:
1. In combination with a vehicle frame having parallel side rails and a cross member, a first pair of leaf springs disposed in rearwardly diverging relationship and spaced above said frame, a second pair of leaf springs disposed in rearwardly diverging relationship and spaced below said frame, a wheel supported at the outer ends of each pair of leaf springs, means pivotally attaching the mid- portion of each spring to said frame, a shackle attached to the inboard end of each spring, means connecting the shackles of one of said pairs of springs to said frame, a hydraulic cylinder mounted on said frame cross member laterally midway thereof, a piston movable in said cylinder, means connecting the shackles of the other of said pairs of springs to said piston, and means for introducing and exhausting fluid from said cylinder.

2. Independent wheel suspension comprising a frame, a pair of vertically spaced horizontally extending leaf springs at each side of said vehicle, vertically directed brackets on each side of said frame extending between the respective springs of each pair substantially midway of the length thereof, fulcrum means pivoted at each end of each bracket and secured in clamping engagement with the adjacent spring, a shackle connecting the inboard end of the lower spring of each pair to said frame, a hydraulic cylinder fixedly secured to said frame transversely midway thereof, a piston movable in said cylinder, a shackle connecting the inboard end of the upper spring of each pair to said piston, and wheel supporting means connected to the outer ends of each pair of leaf springs.

3. In an independent wheel suspension comprising a frame, a pair of vertically spaced horizontally extending leaf springs at each side of said vehicle, vertically directed brackets on each side of said frame extending between the respective springs of each pair substantially midway of the length thereof, fulcrum means pivoted at each end of each bracket and secured in clamping engagement with the adjacent spring, a shackle connecting the inboard end of the lower spring of each pair to said frame, a hydraulic cylinder fixedly secured to said frame transversely midway thereof, a piston movable in said cylinder, means for introducing and exhausting fluid from said cylinder, a shackle connecting the inboard end of the upper spring of each pair to said piston, a steering knuckle extending between and pivotally connected to the outboard ends of each pair of leaf springs, and a wheel rotatably mounted on each knuckle.

4. The structure set forth in claim 3 wherein said piston and cylinder are arranged so that introduction of fluid causes the piston to move in a direction which increases the bending load on the upper spring of each pair.

5. The structure set forth in claim 3 wherein said piston and cylinder are arranged so that introduction of fluid causes the piston to move in a direction opposite to the load imposed on said frame.

6. The structure set forth in claim 3 wherein the pair of springs are obliquely disposed in plan view and diverge toward the rear.

References Cited in the file of this patent
UNITED STATES PATENTS

| | | |
|---|---|---|
| 1,429,411 | Davidson | Sept. 19, 1922 |
| 1,613,763 | Masury | Jan. 11, 1927 |
| 1,868,220 | Rohr | July 19, 1932 |